United States Patent [19]
Araki

[11] 4,029,394
[45] June 14, 1977

[54] COLOR ENCODING FILTER AND METHOD FOR MAKING THE SAME

[75] Inventor: Yoshinobu Araki, Tondabayashi, Japan

[73] Assignee: Minolta Camera Kabushiki Kaisha, Osaka, Japan

[22] Filed: May 15, 1975

[21] Appl. No.: 577,862

[30] Foreign Application Priority Data

May 16, 1974 Japan .............................. 49-53873

[52] U.S. Cl. ................................ 350/166; 313/371; 350/317
[51] Int. Cl.² ...................... G02B 5/28; H01J 29/02
[58] Field of Search ........... 350/317, 166; 313/371; 358/5, 44–47

[56] References Cited
UNITED STATES PATENTS 3,912,962  10/1975  Nobutoki ........................... 313/371

*Primary Examiner*—Ronald J. Stern
*Attorney, Agent, or Firm*—Jackson & Jones Law Corporation

[57] ABSTRACT

A color encoding or dichroic filter for video transmission and method of making the same is provided. The color encoding filter can be used with a vidicon tube to provide color signals for video transmission. The filter comprises a substantially transparent substrate, such as glass, having a plurality of grid patterns superimposed thereon with each pattern individually or in conjunction with an overlapping grid pattern capable of transmitting a predetermined bandwidth of energy. A substantially transparent filler material is utilized to complete the filter structure. The filler material is substantially transparent to the desired transmitted bandwidth of energy and is further optically complementary to the filter material of each individual grid pattern to minimize any refractive scattering of transmitted energy. The filler material also provides both a planar exterior surface to the filter and further permits the filter material of the overlapping grid patterns to be maintained with a constant thickness.

8 Claims, 24 Drawing Figures

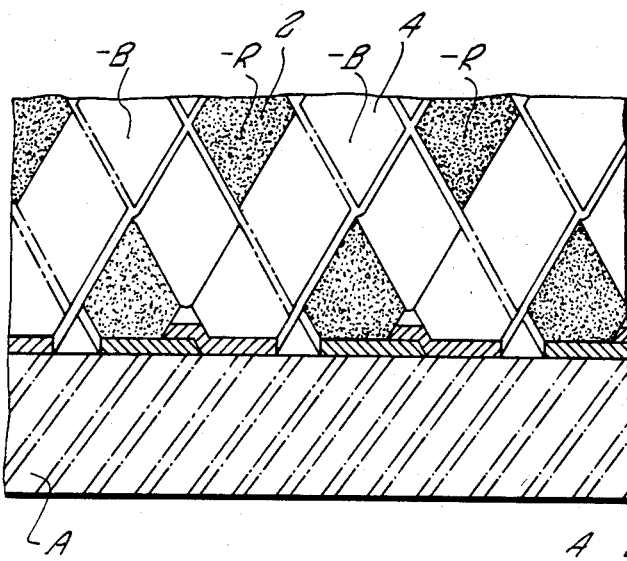
FIG_1.
PRIOR ART
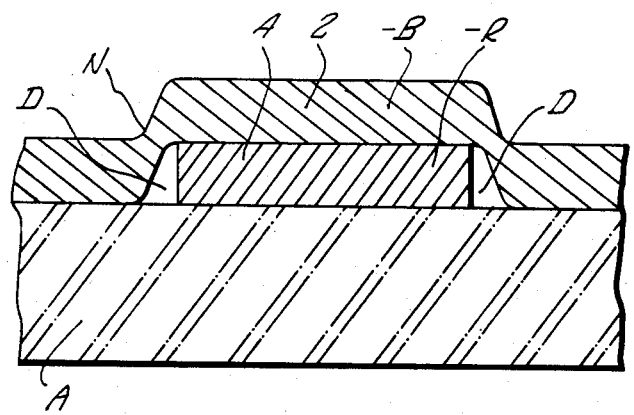
FIG_2.
PRIOR ART
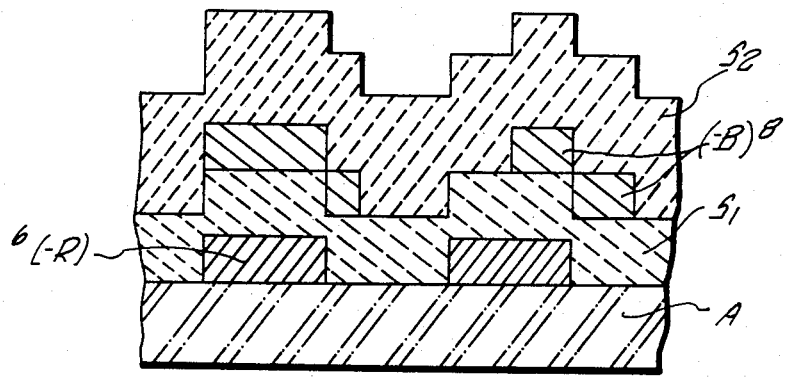
FIG_3.
PRIOR ART
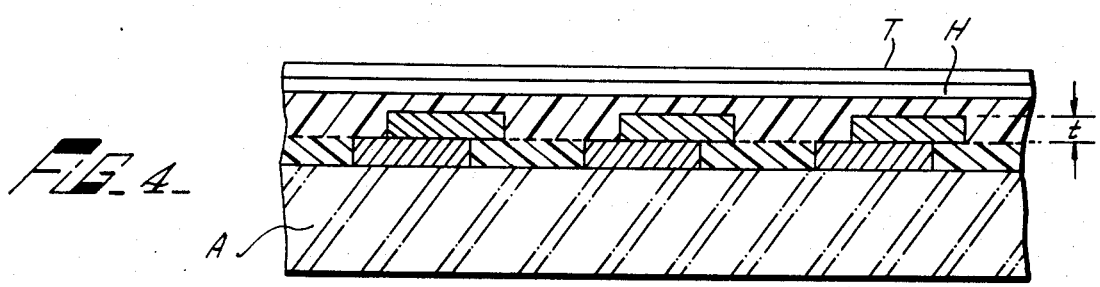
FIG_4.

COLOR ENCODING FILTER AND METHOD FOR MAKING THE SAME

BACKGROUND OF THE INVENTION

1. Field of the Invention

The present invention relates to the structure of a dichoric filter and a method of making the same to provide color encoded signals for video transmission.

2. Description of the Prior Art

In the evolution of color video transmission, various forms of filters and complementary electrical circuits have been utilized to produce a plurality of video signals for subsequent transmission and reconstruction as a projected image. Generally, color television cameras have utilized a single scanning beam with a complementary optical system for focussing the light from the photographic object onto a photoelectric surface to optimize the derivation of a frequency electrical signal representative of component colors and intensity variations. The derivation of a sharp and definitive color signal free of noise or interference has been a prime object in the prior art. In addition, the optical generation of video signals representing both color and brightness which can be easily isolated for subsequent processing has been another goal of the prior art.

Typically, the light from a photographic object is optically converted by a filter into component colors for application to a photoelectric surface of a vidicon or image tube. The scanning beam of the tube will scan the raster to produce a plurality of signal carriers that are respectively amplitude modulated in accordance with the intensity variations of the respective selected component color. The use of a parallel striped filter in such a system is well known as disclosed in the Kell U.S. Pat. No. 2,733,201 and Lesti U.S. Pat. No. 3,378,633 wherein an encoding filter is provided with two grids of lines which have different substractive primary colors and which are angularly superimposed upon one another.

Another example of an encoding filter is found in the Thomasson et al U.S. Pat. No. 3,771,857 wherein a multi layer striped filter is produced with a photo resist technique. The Larsen et al. U.S. Pat. No. 3,681,519; Shinosaki U.S. Pat. No. 3,860,955 and Hasegawa U.S. Pat. No. 3,875,627 are cited of general interest. While numerous encoding filters have been utilized in video transmission there still exists problems in providing efficiently manufactured filters that solve the problems of incorporating an optical filter into an electrical scanning system. In particular, there is still a demand to minimize the optical refracting problems and electrical charge problems that are capable of diminishing the integrity of the resulting encoded signals.

SUMMARY OF THE INVENTION

The present invention provides a dichroic filter for use in a color encoding video transmission system. The color encoding filter of the present invention includes a substrate that is formed from a relatively transparent material, such as glass. A plurality of filter grid patterns are supported by the glass substrate and are respectively capable of transmitting predetermined bandwidths of energy, such as light, to provide a respective encoded color signal. Generally, a first grid pattern will be deposited directly onto the substrate and a second grid pattern will be superimposed over the first grid pattern. A filler material that is substantially transparent to at least the predetermined bandwidths of light to be encoded is also integrated into the filter construction to fill any spatial areas between the respective grid patterns. The filler material is capable of providing an exterior planar surface and may generally be selected from a material having an index of refraction in the medium range to optically complement the respective indices of refraction of the filter grid patterns to minimize any refraction. The filler material also provides a support structure to permit the superimposed filter grid patterns to maintain a constant thickness throughout their pattern and also to minimize any protrusion or corner portions that are capable of collecting and supporting an electrical charge that could introduce noise into the encoded signals when the filter is directly attached to the image tube.

The dichroic filter of the present invention can be manufactured by the depositing of filter material to form grid patterns with the subsequent application of transparent filler material to provide a planar surface.

The features of the present invention which are believed to be novel are set forth with particularity in the appended claims. The present invention, both as to its organization and manner of operation, together with further objects and advantages thereof, may be best understood by reference to the following description, taken in conjunction with the accompanying drawings.

BRIEF DESCRIPTION OF THE DRAWINGS

FIG. 1 is a perspective view of a prior art filter disclosed in U.S. Pat. No. 3,771,857;

FIG. 2 is a cross sectional view of the grid pattern of the prior art filter disclosed in FIG. 1;

FIG. 3 is a cross sectional view of a prior art filter disclosed in the Japanese Utility Model Publication No. 46-36981;

FIG. 4 is a cross sectional view of the dichroic filter of the present invention adjacent a vidicon envelope; and FIG. 5 is a schematic illustration of the manufacturing steps that can be utilized to produce the present invention with each individual step being represented sequentially from (a) to (t).

DESCRIPTION OF THE PREFERRED EMBODIMENT

Figure 6:
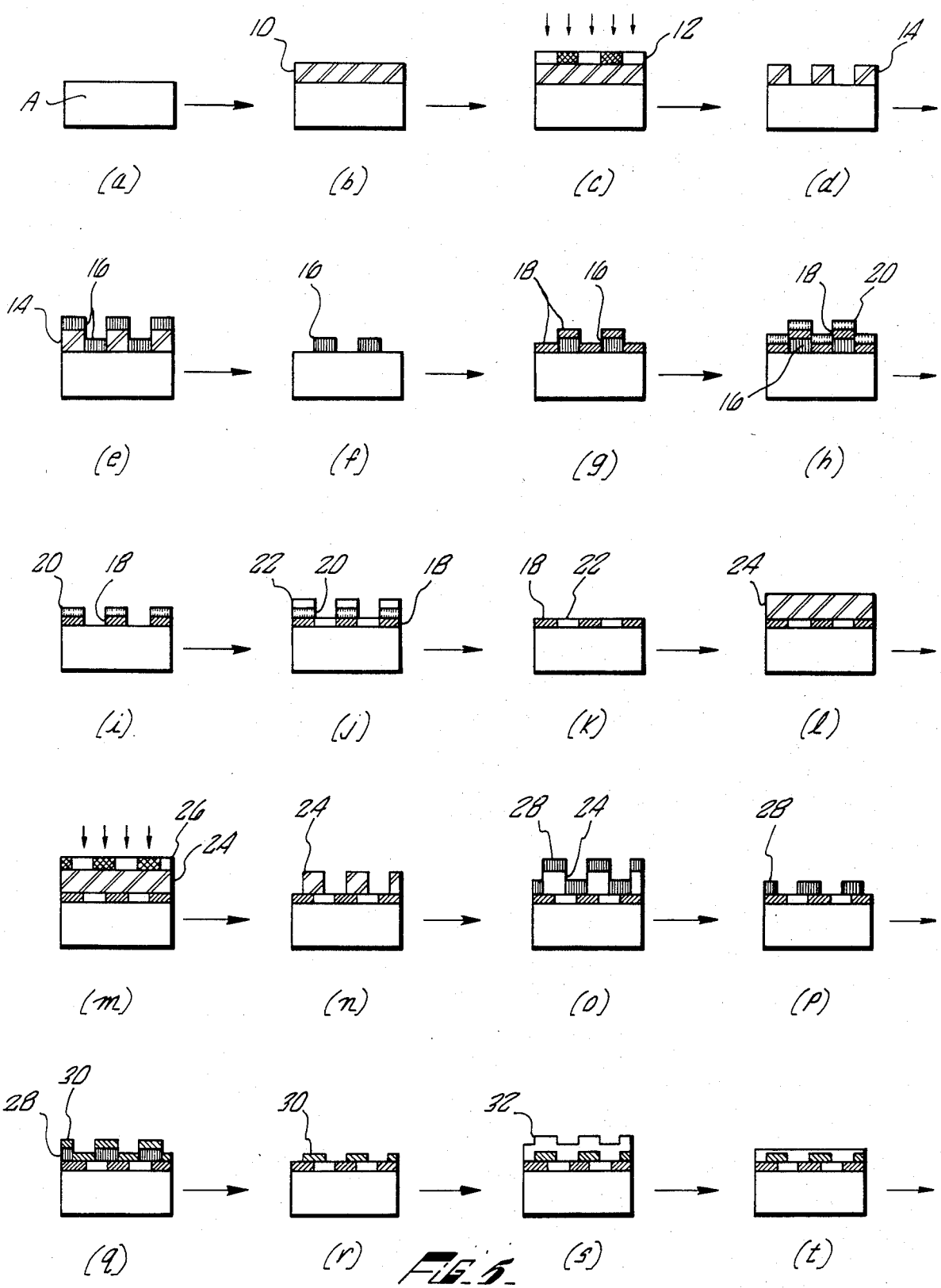

The following description is provided to enable any person skilled in the optical design and video transmission art to make and use the invention and it sets forth the best modes contemplated by the inventor of carrying out his invention. Various modifications, however, will remain readily apparent to those skilled in the above arts, since the generic principles of the present invention have been defined herein specifically to provide a relatively economical and easily manufactured dichroic filter.

Referring to FIG. 1, a prior art striped filter is disclosed as described in U.S. Pat. No. 3,771,857. The filter comprises a glass substrate, A, having deposited thereon a pair of spaced parallel filter strips 2 and 4 that overlap. Filter strip 2 is capable of reflecting light energy in the red bandwidth or transmitting cyan, while filter strip 4 is capable of reflecting blue or transmitting yellow. The individual filter strips 2 and 4 are multilayer coatings that are applied by vacuum deposition.

A schematic cross sectional view of the color encoding filter of FIG. 1 is disclosed in FIG. 2 and illustrates a magnified interface of the crossing of filter strip 2 over filter strip 4. As can be seen from FIG. 2, the deposition of the overlapping filter strip 2 can provide a discontinuity or gap, D, adjacent the respective side surfaces of the filter strip 4. With a vacuum deposition process, the exact size, nature and in fact the existence of a gap, D, will be determined by numerous parameters, such as the surface tension between the relative materials, temperature, etc. In addition, depending upon the flow characteristics of the composite material forming filter 2 a necked down area, N, can be created which will vary the thickness of the filter strip 2 along its length. The consequences of a gap or space, D, and a necked down portion, N, in a filter are to create a variance in optical transmission characteristics, and actual structural weakness to the filter assembly and a possible electrical charge imbalance across the filter surface. The resulting effect is to create undesired noise in the encoded signals which will deteriorate the quality of any subsequently displayed image from the video color signals. As can be appreciated by those skilled in the art, the variance of the optical thickness of the layer will directly affect the frequency transmission characteristics of the filter strip. While any imbalance or build up of electrical charges can also produce dispersion affects, which will result in raising the interference noise in the system resulting in a degradation of the quality of the transmitted color signals.

FIG. 3 discloses a cross sectional view of another color encoding filter more fully described in the Japanese Utility Model Publication No. 46-36981. Basically, the filter of FIG. 3 comprises a glass substrate, A, having a first filter strip 6 and a second isolated filter strip 8. The red reflecting dielectric filter strip 6 is deposited directly ypon the substrate, A. A layer of silicon dioxide, $SiO_2$, is then vacuum evaporated to form a transparent $S_1$ layer which encapsulates the first filter strip 6. Subsequently, the second blue reflecting filter strip 8 is deposited on top of the $S_1$ layer in a predetermined pattern. Finally, another layer, $S_2$, of $SiO_2$, is evaporated over the second filter strip 8. The surface configuration shown in FIG. 3, reflects the composite deposition of the underlying layers to provide an irregular shape. The edge or corner configurations of the filter of FIG. 3 is susceptible to an accumulation of electric charge adjacent the corners especially with the use of dielectric material and in addition is further susceptible to optical edge refraction problems. The use of the $SiO_2$ layers, $S_1$ and $S_2$ are an improvement over a simple air interface but do not provide the optimum solution to the refractive problems associated with indices boundary interface differential.

The present invention recognizes and attempts to solve the above problems of the prior art in an economical fahion. The present invention eliminates any open spaces or gaps between filter grid patterns while providing both intermediate and exterior planar surfaces with the use of a substantially transparent material. The transparent material has an optically complementary refractive index to that of the material forming each of the dielectric filter strip layers. The present invention can be advantageously utilized in interfacing with the vidicon tube and television cameras and also with charge-coupled devices in solid state tubeless television cameras. The dichroic filter of the present invention is placed in the image plane of the color camera and this can be advantageously accomplished by placing the dichroic filter within the vidicon tube and integral with the face plates of the vidicon tube as can be seen in the cross sectional view of the present invention in FIG. 4. The use of dielectric material in the present invention as opposed to organic color material is particularly advantageous when the dichroic filter is placed in the vidicon tube. Dielectric material is heat resistant and suitable for use with phosphate materials.

Referring to the process steps (a) through (t) disclosed schematically in FIG. 5, a transparent substrate such as a glass plate, A, having a pair of flat planar surfaces is appropriately cleaned and prepared to receive a removable coating material, such as a conventional photoresist. Since the substrate may be subjected to heat it is desirable that a low coefficient expansion glass be utilized and further that the planar surfaces be extremely flat. The exact shape of the substrate can vary depending upon the desired application. The photoresist can be procured from a conventional source, such as the E.I. Dupont DeNemours & Co. or the Eastman Kodak Co. The removable coating or photoresist layer is conventionally applied in a micron thickness range. The photoresist layer 10 is appropriately dried for example by baking, and then exposed, as shown in step (c) through an appropriate photomask 12 having a predetermined pattern, to a source of collimate light such as ultra violet light from a high pressure mercury lamp. Appropriate measures can be taken to prevent any reflection of the ultra violet light into undesired areas of the photoresist material 10.

The resulting polymerized photoresist pattern can then be developed by utilizing a suitable commercial developer to remove the unpolymerized photoresist. The first predetermined photoresist pattern 14 can then be appropriately rinsed and dried to provide the cross sectional configuration seen in step (d). The filter blank, that is the glass substrate plus the applied coating, disclosed in step (d) can be appropriately processed to stabilize the photoresist pattern 14 as is well known in the prior art.

In step (e), an appropriate metal film is deposited on both the substrate and the striped pattern 14 of photoresist material. The use of a metal layer having a thickness in the 0.1 micron range such as Nickle or chromium is well known. The removable metal layer 16 on the substrate forms the second pattern shown in step (f) after the photoresist pattern 14 is removed by applying Trisren or Kyslen. Again, as known in the prior art, the filter blank can be appropriately treated between each process step. Referring to step (g), the first multilayer coating or dielectric filter strip is deposited on both the glass substrate and on the metal layer 16. The multilayer coating or laminate 18 has the capability of reflecting the visual red bandwidth and comprises a plurality of high and low index materials. Some of the applicable high index materials with their index of refractions in parentheses are set forth as follows;

NH — $CeO_2$ (2.00–2.30), $ZrO_2$ (1.95–2.10), $TiO_2$ (2.00–2.30), $Ta_2O_5$ (2.00–2.30), $ThO_2$ (2.00–2.20).

Some of the low index materials that can be utilized in coating 18 are as follows;

NL—$MgF_2$(1.385), $SiO_2$ (1.46) $ThF_4$(1.50), $LaF_2$(1.56), $LaF_3$(1.59), $Ba_3(AlF_4)$ (1.35), LiF (1.32–1.38)

Referring to step (h) another removable coating, such as a metal film can be deposited on both the first metal layer 16 and the first multilayer dielectric coating 18. As can be seen in step (i) the first metal layer 16 can be etched off by conventional techniques to provide an exposed glass substrate with the pattern of the first multilayer coating 18 supporting the second metal layer 20.

Step (j) of the present invention is important in realizing some of the advantages of the present invention over that of the filters of the prior art. In step (j), a substantially transparent filler material, at least to the bandwidths of energy that are to be transmitted by the filter grids on the substrate, is provided. Preferably, the transparent filler material has an index of refraction of a medium range, that is, between 1.60 and 1.95 and is utilized to optically complement the high and low index material of the filter grids. Some of the applicable medium refractive index material, NM, that can be utilized are the following with their index of refraction in parentheses:

$Al_2O_3$ (1.65), MgO (1.72), $CeF_3$ (1.62), $LaF_3$ (1.59), $NdF_3$ (1.60), BeO (1.60), $ThOH_2$ (1.70), $InO_2$ (1.8-1.9) and a mixture of MgO and $Al_2O_3$ (1.72-1.65).

By the use of a transparent filler matrial having a mean average refractive index value between the high and low indices of the filter grid material, refractive scattering at the boundary interfaces is minimized. The particular design of the multilayer filter strips will be adjusted to maximize the advantage of the use of the medium refractive index material, NM, as the transparent filler. In this regard at least the final coating layer furtherest from the glass substrate can be designed to accommodate the advantages of the medium refractive index material. In addition, the filler material 22 is preferably applied at a thickness of approximately the same depth as the first multilayer coating 18.

As can be seen from step (k), in FIG. 5, with the subsequent removal of the second metal layer 20 by an etching process, the resultant filter blank will have a flat planar surface which includes the first grid pattern of a multilayer coating 18 capable of transmitting a first predetermined bandwidth of energy and a transparent filler material coacting with the first grid pattern by filling any spatial area between the first grid pattern to eliminate or minimize the effect of any edges or interface boundaries with regards to both electrical and optical interference to the resulting encoded color signals. The flat interior planar surface disclosed in step (k) further provides a 112 base for the depositing of a second grid pattern and facilitates the maintenance of a constant thickness, $t$, across the second grid pattern with resulting improved optical properties and mechanical strength.

The subsequent steps are somewhat repetitive of the photoresist development and metal etching process steps mentioned above. In step, (l), a second layer of a removable coating material such as a photoresist layer 24 is deposited on the first planar surface of the filler material 22 and first multilayer coating 18. Subsequently, as shown in step (m), a second photomask 26 is utilized to develop a pattern in the photoresist layer 24.

With the removal of the undeveloped photoresist layer 24, the desired second pattern remains on the substrate blank, as can be seen in step (n). A third metal layer 28 is deposited above the photoresist pattern in step (o). Referring to step (p) the photoresist layer 24 is removed to leave a desired metal layer pattern. A second multilayer coating 30 is deposited on the third metal layer pattern 28 in step (g). As with the first multilayer coating 18, the second multilayer coating 30 comprises a plurality of high and low index dielectric material. In this regard, the transmission characteristics of the second multilayer coating is such to reflect a visual blue bandwidth and to transmit yellow.

The third metal layer 28 is appropriately etched away to leave the desired second multilayer coating grid pattern as can be seen in step (r). Again, a transparent filler material of a medium indexed material can be deposited above the second multilayer 30 and is preferably of the same medium indexed material as utilized for the first transparent filler material 22. After the appropriate curing and hardening of the transparent material, the surface of the filter blank can be ground or polished to provide a coplanar surface with that of the substrate as can be seen in step (t). The resultant completed dichroic filter of the present invention can be seen in a cross sectional view in FIG. 4. The total thicknesses, $t$, of both the first multilayer coating 18 forming the first filter pattern and the second multilayer 30 forming the second filter pattern are maintained constant across the substrate. The symbol T represents a photoelectric layer while H represents a transparent and electrically conductive layer such as a Nesa coating.

FIG. 4 discloses the dichroic filter of the present invention positioned in the image plane of the video system and adjacent the face of the vidicon envelope. The planar surface of the present invention is particularly adapted to provide a highly advantageous interface with the vidicon envelope although it may be used at other positions between the image surface and the object.

The use of a transparent filler matrial selected from a medium range index of refraction material is advantageous for reducing any refractive scattering problems adjacent the interface boundaries of the respective first and second filter grid stripes. In addition, the transparent filler material helps minimize any point charge electrical affect on the dielectric material that is utilized in the multilayer stripe coatings.

Some of the advantages of the present invention can also be realized with the use of a filler material other than one selected from a medium index of refraction. For example, magnesium fluoride ($MgF_2$— 1.385), Silicon Dioxide ($SiO_2$ — 1.46) and borate glas having a composition of $SiO_2$ and $B_2O_3$ (from 5 to 7 percent) and an index of refraction of about 1.46 – 1.48 could also be utilized.

Generally, the filter strips will overlap at an angle of 60° and have a width of 20 to 50 microns with equal spaces therebetween. The principles of the present invention are applicable to filter structures having greater than three layers.

However, variations of these parameters are obviously possible while still accomplishing the same results accordingly the scope of the present invention should be determined solely from the following claims.

What is claimed is:

1. A dichroic filter to provide color signals for video transmission comprising:
   a substrate;
   a first grid pattern, formed of both a high and low index of refraction material, having a substantially upper flat planar surface of a substance capable of transmitting a first predetermined bandwidth of energy, covering a portion of the substrate;
   a second grid pattern, formed of both a high and low index refraction material, capable of transmitting a second predetermined bandwidth of energy superimposed directly on the upper planar surface of at least a portion of the first grid pattern, the second grid pattern having a constant thickness throughout the pattern and lying substantially in a single plane; and a filler material having a medium index of refraction in the range of 1.59 to 1.95 and being substantially transparent to at least both the first and second predetermined bandwidths of energy and coacting with the first and second grid patterns to fill any spatial areas between both of the grid patterns and also the substrate whereby a flat surface is provided on the dichroic filter, the high index material having an index higher than the medium range and the low index material having an index lower than the medium range.

2. The invention of claim 1 wherein the transparent filler material is selected from a group consisting of $MgF_2$, $SiO_2$ and a borate glass having an index of refraction between 1.46 and 1.48.

3. The invention of claim 1 wherein the filler material covers both grid patterns.

4. A spectral transmission filter assembly to provide color signals of improved resolution comprising:
a substrate;
a first pattern layer supported by and covering a portion of the substrate and capable of transmitting a first predetermined bandwidth of energy;
a second pattern layer superimposed over the first pattern layer and capable of transmitting a second predetermined bandwidth of energy, each pattern layer being formed of at least a high index of refraction material within the approximate range of 1.95 to 2.30 and a low index of refraction material in the approximate range of 1.32 to 1.59; and
a filler material substantially transparent to at least the first and second bandwidth of energy positioned between and covering that portion of the substrate not covered by the first pattern layer, the transparent filler material having an index of refraction in the approximate range of 1.59 and 1.95.

5. The invention of claim 4 further including the substantially transparent filler material covering both the first and second pattern layers.

6. The invention of claim 5 wherein the transparent material has a planar surface.

7. A dichroic filter for use with a vidicon tube to provide color signals for video transmission comprising:
a substrate;
a first striped pattern of multilayered laminate having an upper planar surface, capable of transmitting a first predetermined bandwidth of energy and covering a portion of the substrate;
a second striped pattern of multilayered laminate capable of transmitting a second predetermined bandwidth of energy superimposed directly on the upper planar surface of at least a portion of the first grid pattern, the second grid pattern having a constant thickness throughout its pattern and lying substantially in a single plane, the first and second striped patterns being formed of both a high index of refraction material within the approximate range of 1.95 to 2.30 and low index of refraction material in the approximate range of 1.32 to 1.59; and
a filler material substantially transparent to at least both the first and second predetermined bandwidths of energy and coacting with the first and second striped patterns to fill any spatial areas between both of the striped pattern and also the substrate to provide a flat planar surface on the dichroic filter, the filler material having a medium index of refraction in approximately the range of 1.59 to 1.95.

8. The invention of claim 2 wherein the transparent filler material is selected from a group consisting of $Al_2O_3$, $CeF_3$, $MgO$, $NaF_3$, $BeO$, $ThOH_2$, $InO_2$ and a mixture of $MgO$ and $Al_2O$.

* * * * *

UNITED STATES PATENT AND TRADEMARK OFFICE
CERTIFICATE OF CORRECTION

PATENT NO. : 4,029,394
DATED : June 14, 1977
INVENTOR(S) : Yoshinobu Araki

It is certified that error appears in the above-identified patent and that said Letters Patent are hereby corrected as shown below:

Col. 4, line 18 delete "DeNemours" and insert --DeMemours--.

Col. 4, line 42 delete "chromium" and insert --Chromium--.

Col. 5, line 46 delete "112".

Col. 6, line 33 delete "matrial" and insert --material--.

Col. 6, line 45 delete "glas" and insert --glass--.

Signed and Sealed this

Eleventh Day of October 1977

[SEAL]

Attest:

RUTH C. MASON
*Attesting Officer*

LUTRELLE F. PARKER
*Acting Commissioner of Patents and Trademarks*